(12) United States Patent
Naamad et al.

(10) Patent No.: US 9,282,053 B1
(45) Date of Patent: Mar. 8, 2016

(54) TECHNIQUES FOR DYNAMIC RESOURCE PARTITIONING

(71) Applicant: EMC Corporation, Hopkinton, MA (US)

(72) Inventors: Amnon Naamad, Brookline, MA (US); Marik Marshak, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 411 days.

(21) Appl. No.: 13/857,454

(22) Filed: Apr. 5, 2013

(51) Int. Cl.
*G06F 15/173* (2006.01)
*H04L 12/911* (2013.01)
*G06F 9/48* (2006.01)
*G06F 9/50* (2006.01)
*H04L 29/08* (2006.01)
*G06F 9/455* (2006.01)
*H04L 12/24* (2006.01)

(52) U.S. Cl.
CPC ............ *H04L 47/70* (2013.01); *G06F 9/45533* (2013.01); *G06F 9/4881* (2013.01); *G06F 9/5077* (2013.01); *H04L 41/50* (2013.01); *H04L 67/1097* (2013.01); *H04L 69/329* (2013.01)

(58) Field of Classification Search
CPC ... H04L 41/0896; H04L 47/70; H04L 69/329; H04L 67/1097; H04L 41/50; G06F 9/4881; G06F 9/5077; G06F 9/45533
USPC .................................. 709/226, 223; 711/156
See application file for complete search history.

(56) References Cited

U.S. PATENT DOCUMENTS

| 7,047,366 | B1 | 5/2006 | Ezra |
| 7,281,086 | B1 | 10/2007 | More et al. |
| 7,558,919 | B1 | 7/2009 | Yochai et al. |
| 7,676,578 | B1 * | 3/2010 | Zhu et al. ...................... 709/226 |
| 7,957,398 | B1 | 6/2011 | Yochai et al. |
| 8,381,213 | B1 | 2/2013 | Naamad et al. |
| 8,954,979 | B1 * | 2/2015 | Myers et al. .................. 718/104 |
| 2006/0129687 | A1 * | 6/2006 | Goldszmidt et al. .......... 709/229 |
| 2011/0185064 | A1 * | 7/2011 | Head et al. .................... 709/226 |
| 2011/0291748 | A1 * | 12/2011 | Li et al. ........................ 327/544 |
| 2013/0326064 | A1 * | 12/2013 | Gulati et al. ................. 709/226 |
| 2014/0146961 | A1 * | 5/2014 | Ristock et al. ........... 379/265.12 |

OTHER PUBLICATIONS

Arieh Don, et al., "Techniques for Adjusting Priorities Associated With Servicing Requests," U.S. Appl. No. 11/900,062, filed Sep. 10, 2007.

Yechiel Yochai, et al., "Providing Service Based on Time to Become Urgent," U.S. Appl. No. 11/540,017, filed Sep. 29, 2006.

* cited by examiner

*Primary Examiner* — Jungwon Chang
(74) *Attorney, Agent, or Firm* — Muirhead and Saturnelli, LLC

(57) ABSTRACT

Described are techniques for partitioning resources. A plurality of resource limit ranges are specified for a plurality of tenants of a system. Each of the plurality of resource limit ranges have a lower bound and an upper bound. A plurality of current resource limits are determined. Each of the plurality of current resource limits indicate a current resource limit for one of the plurality of tenants. Each current resource limit for one of the tenants is a value included in one of the plurality of resource limit ranges specified for the one tenant. The plurality of current resource limits are dynamically determined in accordance with a current state of the system.

20 Claims, 10 Drawing Sheets

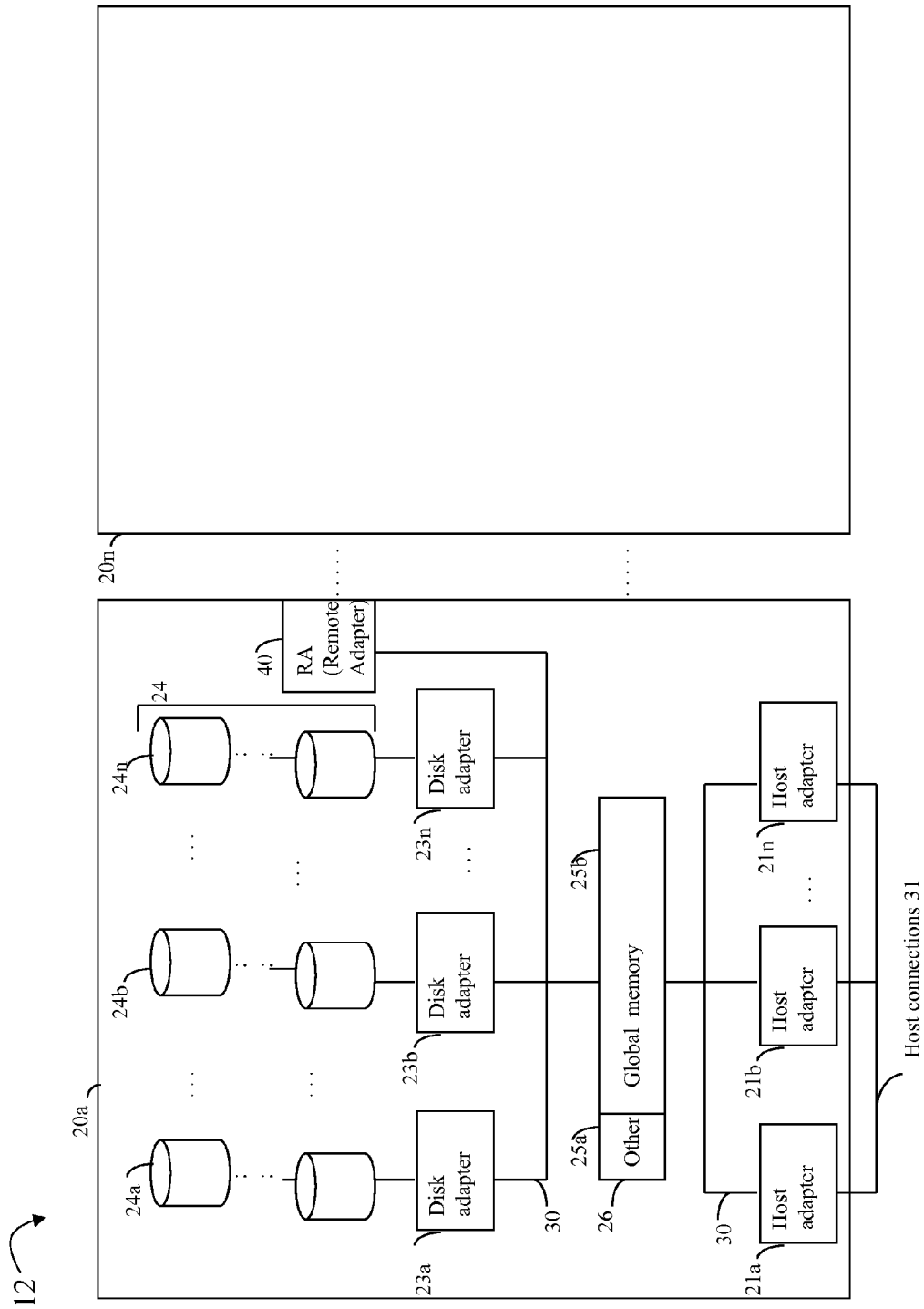

TECHNIQUES FOR DYNAMIC RESOURCE PARTITIONING

BACKGROUND

1. Technical Field

This application generally relates to resource allocation, and more particularly to techniques used for partitioning resources of a system among multiple consumers or tenants.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

An application may execute on a host where the application performs I/O (input/output) operations. The host may be able to transmit the data operation to the data storage system over any one or more different paths or multiple paths. Different techniques may be used in connection with partitioning the resources of the data storage system, or more generally, any system, used by multiple applications, or more generally consumers of the resources or tenants of the system. Storage groups of logical devices may be defined where each such storage group may be used by one or more applications. In some systems, fixed static limits may be imposed and enforced per storage group of logical devices. For example, a static limit of a particular amount of cache or other resource of the data storage system may be specified for each storage group so that data operations directed to the storage group are subject to the static limit specifying a maximum amount of the resource that may be used with respect to data operations directed to the storage group.

SUMMARY OF THE INVENTION

In accordance with one aspect of the invention is a method of partitioning resources comprising: specifying a plurality of resource limit ranges for a plurality of tenants of a system, each of said plurality of resource limit ranges having a lower bound and an upper bound; and determining a plurality of current resource limits, each of said plurality of current resource limits indicating a current resource limit for one of said plurality of tenants, wherein said each current resource limit for said one tenant is a value included in one of the plurality of resource limit ranges specified for said one tenant, and wherein said plurality of current resource limits are dynamically determined in accordance with a current state of the system. The current resource limit for the one tenant may indicate a current maximum amount of resource consumption allowable for the one tenant in a data storage system. The one resource limit range for the one tenant may have a lower bound identifying a minimum allowable value for said each current resource limit for the one tenant. The one resource limit range for the one tenant may have an upper bound identifying a maximum allowable value for said each current resource limit for the one tenant. The system may be a data storage system and the current state of the data storage system may be one of a compliance state and a non-compliance state. When the data storage system is in the compliance state, the data storage system may be determined to have no resource contention or that no resource contention is likely, and the data storage system may otherwise be in the non-compliance state if not in the compliance state. The data storage system may transition between the compliance state and the non-compliance state in accordance with state transition criteria. The method may also include determining at a point in time whether the data storage system has resource contention or is likely to have resource contention, wherein the state transition criteria may include an indicator having a first setting at the point in time if it is determined at the point in time that the data storage system has no resource contention or that no resource contention is likely, and otherwise the indicator may have a second setting. The state transition criteria may include the indicator and may specify that if the data storage system is in the compliance state at the point in time and the indicator has the second setting at the point in time, the data storage system may transition from the compliance state to the non-compliance state. The state transition criteria may specify that if the data storage system is in the non-compliance state at the point in time, the data storage system may remain in the non-compliance state until the indicator has a value of the first setting for more than a threshold number of consecutive points in time, whereby the data storage system may transition from the non-compliance state to the compliance state after the indicator has a value of the first setting more than the threshold number of consecutive points in time. When in the non-compliance state, first processing may be performed where the first processing may include processing to reduce one or more of the plurality of current resource limits in accordance with one or more limit reduction criteria. A first of the plurality of tenants may have a first of the plurality of current resource limits that is a first value included in a first of the plurality of resource limit ranges associated with the first tenant, and the first processing performed with respect to said first tenant may further comprise determining whether the first current resource limit is less than a first lower bound of the first resource limit range; and reducing the first current resource limit to a first reduced limit if the first current resource limit is less than the first lower bound, wherein said first lower bound is included in the limit reduction criteria. The first reduced limit may be determined in accordance with the limit reduction criteria including the first lower bound, a difference between the first lower bound and the first current resource limit, and a reduction factor. When in the compliance state, first processing may be performed. The first processing may include processing to increase one or more of said plurality of current resource limits in accordance with one or more limit growth criteria. A first of the plurality of tenants may have a first of the plurality of current resource limits that is a first value included in a first of the plurality of resource limit ranges associated with the first tenant, and the first processing performed with respect to the first tenant may increase the first current resource limit for the first tenant if the first current resource limit does not exceed a first upper bound of the first resource limit range. The limit growth criteria may include the first upper bound. The first processing may include determining a revised first current resource limit for the first tenant in accordance with the limit growth criteria including the first upper bound, a first lower bound of the first resource limit range, an actual resource usage or actual resource usage rate denoting current resource usage by the first tenant, and a growth factor. The plurality of tenants may be applications executing on one or more hosts that issue data operations to the data storage system. The indicator may have a value of the first setting or the second setting determined in accordance with one or more contention indicator criteria including any of a utilization threshold denoting a level of utilization of one or more front end components of the data storage system at which data operation requests are received from said applications, a threshold length of one or more queues of outstanding data operations received at the data storage system and a threshold amount of times that the threshold length is exceeded, and a threshold response time. The system may be a data storage system and the plurality of tenants may be applications executing on one or more hosts that issue data operations to the data storage system. Each of the plurality of resource limit ranges may specify a lower bound that is a minimum I/O rate and an upper bound that is a maximum I/O rate. Each of the plurality of current resource limits may indicate a current resource limit for one of the plurality of resource limit ranges and may specify a current I/O rate limit for one of the applications associated with said each current resource limit and said one resource limit range. The plurality of current resource limits may be determined in accordance with first processing when an option has a first value. The plurality of current resource limits may be determined in accordance with second processing when the option has a second value different from the first value. The first processing may dynamically determine the plurality of current resource limits in accordance with the current state of the data storage system. The second processing may determine each of the plurality of current resource limits as a single static value that does not vary dynamically in accordance with the current state of the data storage system.

In accordance with another aspect of the invention is a computer readable medium comprising code stored thereon for partitioning resources, the computer readable medium comprising code for: specifying a plurality of resource limit ranges for a plurality of tenants of a system, each of said plurality of resource limit ranges having a lower bound and an upper bound; and determining a plurality of current resource limits, each of said plurality of current resource limits indicating a current resource limit for one of said plurality of tenants, wherein said each current resource limit for said one tenant is a value included in one of the plurality of resource limit ranges specified for said one tenant, and wherein said plurality of current resource limits are dynamically determined in accordance with a current state of the system.

BRIEF DESCRIPTION OF THE DRAWINGS

Features and advantages of the present invention will become more apparent from the following detailed description of exemplary embodiments thereof taken in conjunction with the accompanying drawings in which:

FIG. 2A is an example of an embodiment of a data storage system;

DETAILED DESCRIPTION OF
EMBODIMENT(S)

Figure 1:
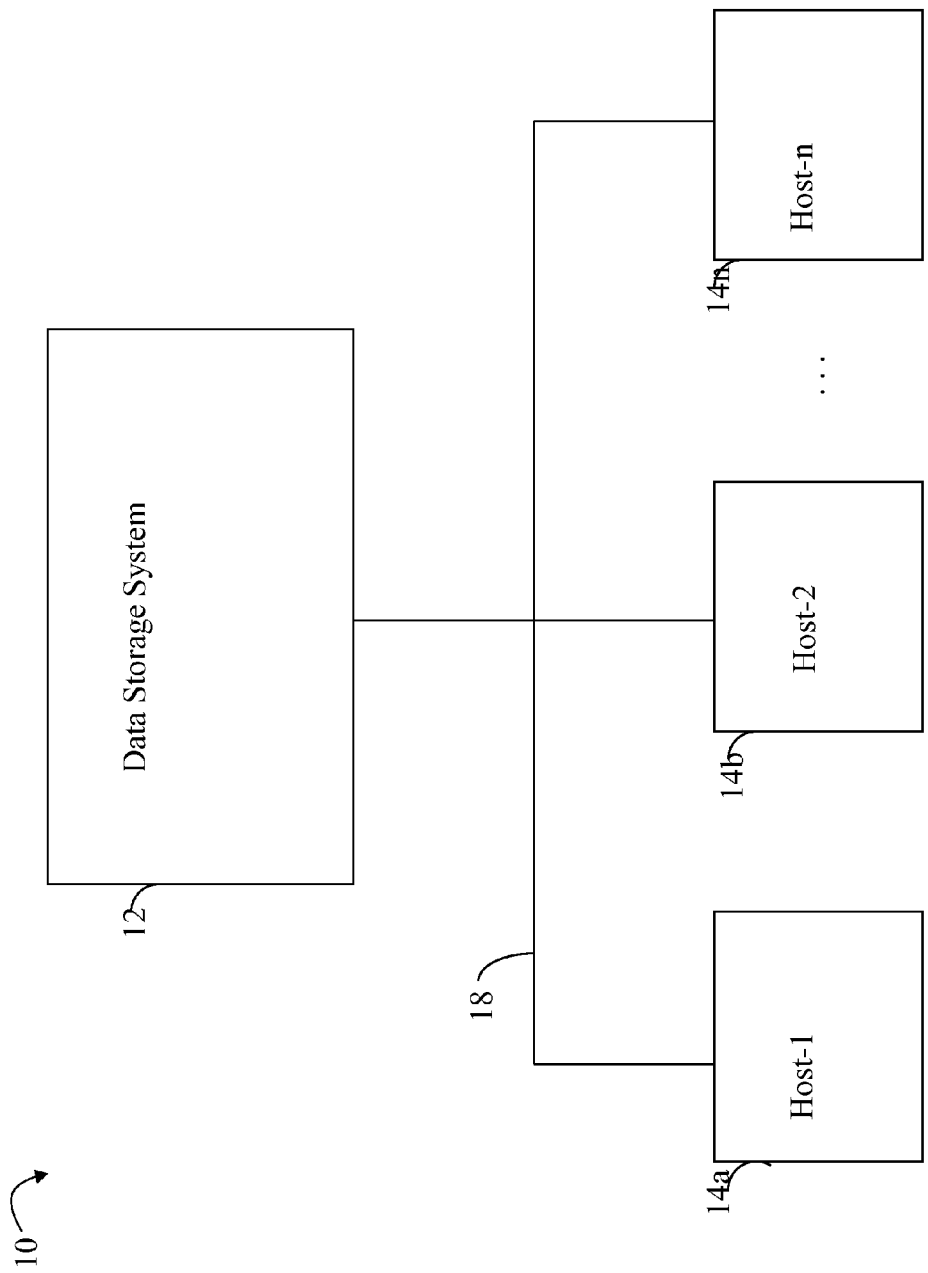
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA performs I/O operations on a disk drive. Data residing on a disk drive may be accessed by the DA following a data request in connection with I/O operations that other directors originate.

Figure 2B:
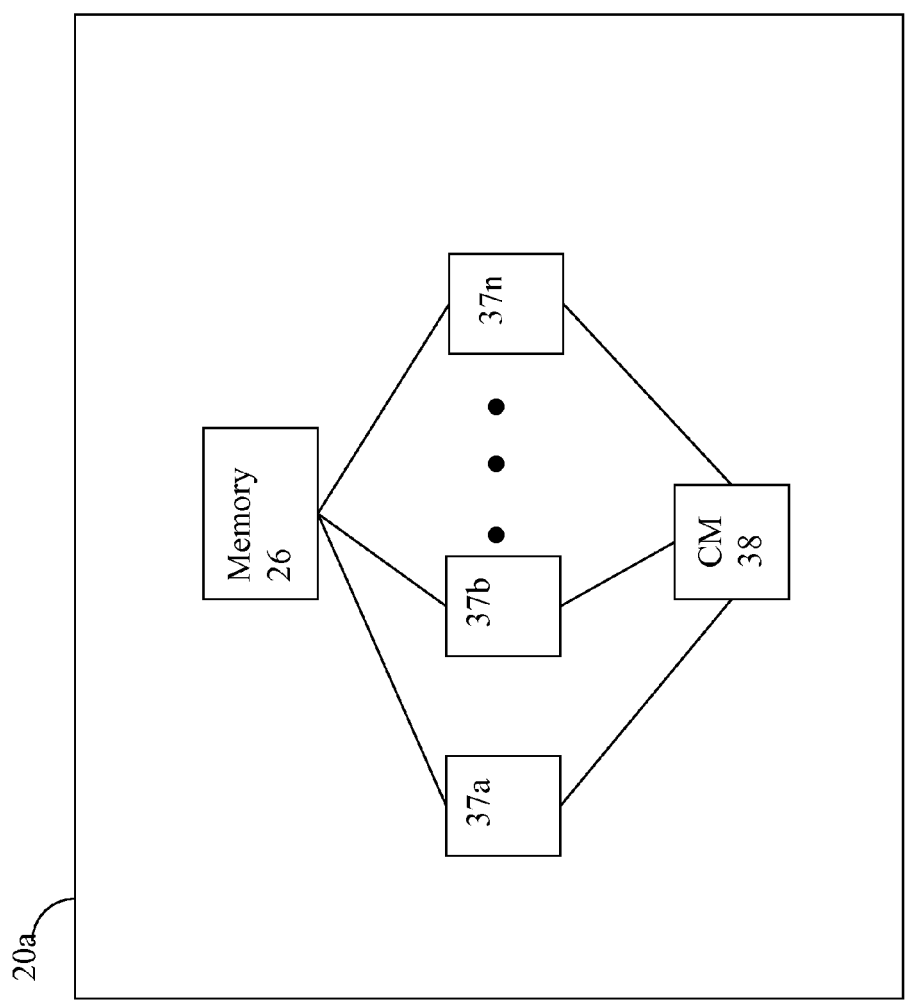
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system.

Figure 3:
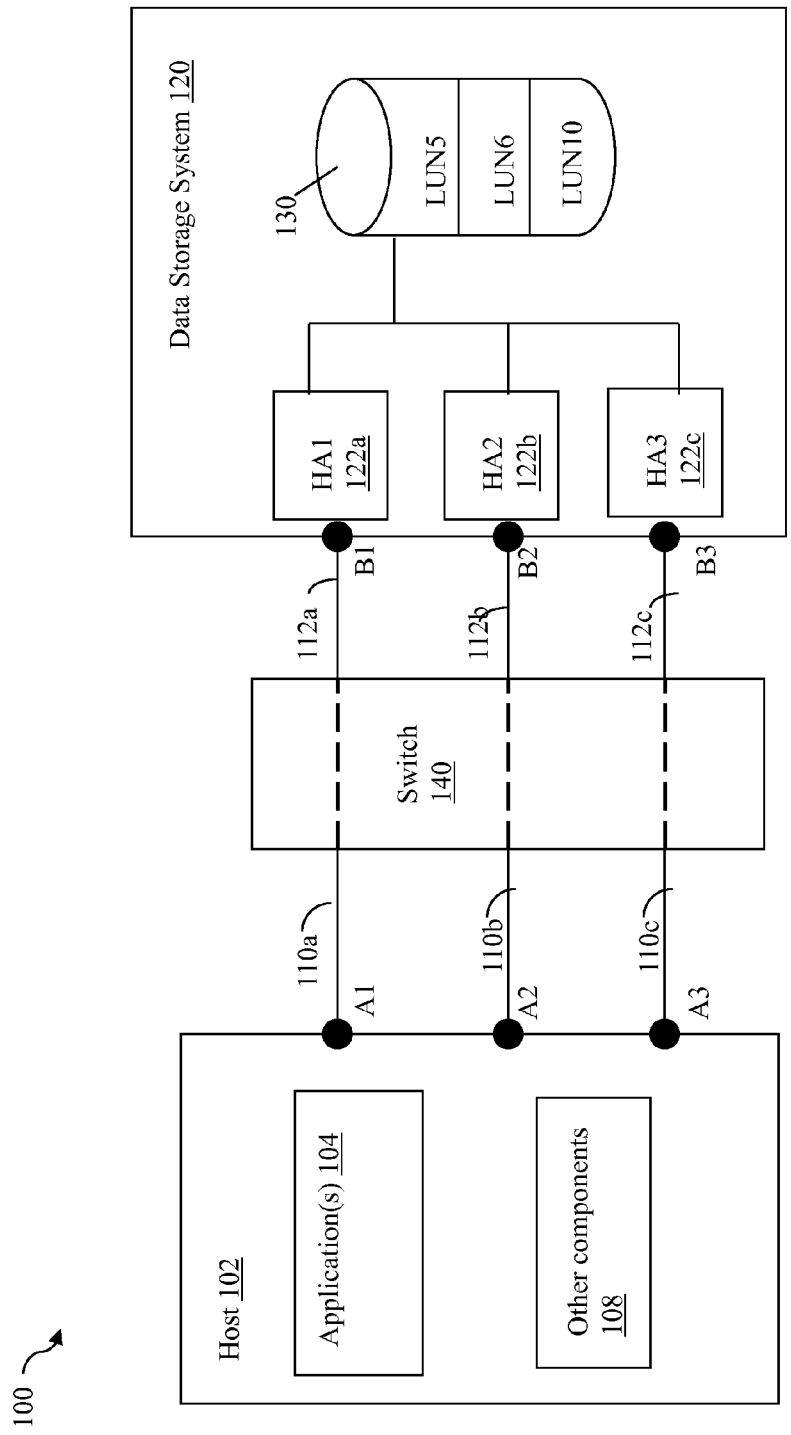
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein. For example, the LUNs may be configured to have storage provisioned from multiple different physical devices rather than a single physical device, and multiple hosts having multiple applications executing thereon may communicate with the data storage system.

The host 102 may include one or more applications 104 and other components 108 whereby element 108 may include, for example, one or more other device drivers and other code. An I/O operation from the application 104 may be communicated to the data storage system 120 using one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over one or more physical paths. As such, each of the I/O operations may be forwarded from the application 104 to the data storage system 120 over one of the possible multiple paths.

The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104.

The data storage system 120 may include one or more physical data storage devices, such as device 130, where each such physical device may be configured to store data of one or more LUNs as described above. Each of the LUNs having data stored on the device 130 may be configured to be accessible to the host through one or more paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Figure 4:
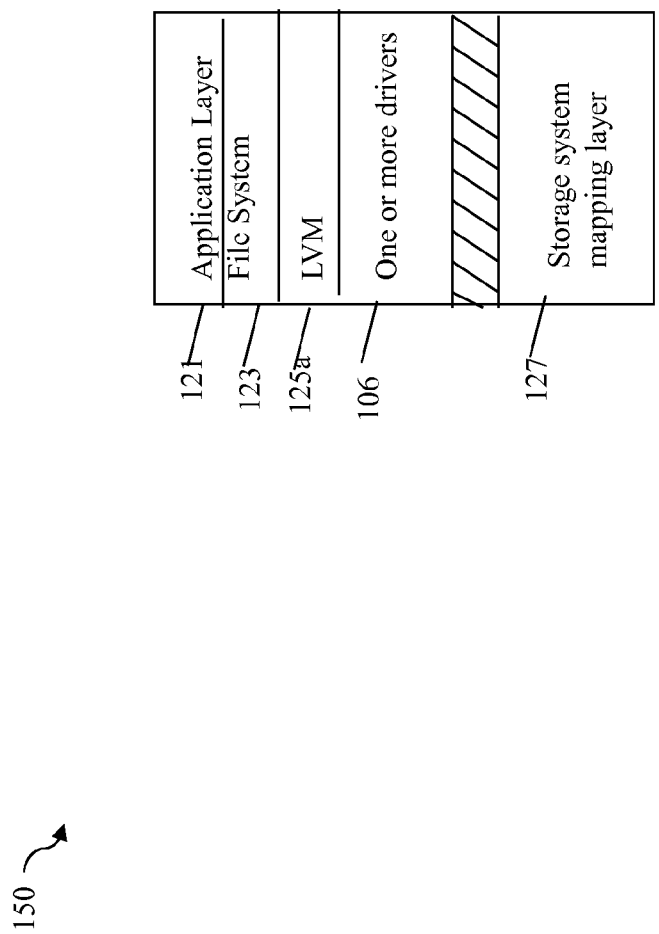
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with performing a data operation request issued by a host to a data storage system such as illustrated in FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be one or more drivers 106 which handle processing of the I/O received from layer 125a. The one or more drivers represented by 106 may include, for example, a SCSI driver (e.g., performs processing for sending requests and receiving responses in accordance with the SCSI standard), a hardware driver (e.g., a driver for an HBA of the host which sends commands or requests to the data storage system and also receives responses and other communications from the data storage system), and the like. Generally, one or more layers between the application layer 121 and the one or more drivers 106 may provide for mapping a LUN (such as used in connection with block-based storage) presented by the data storage system to the host to another logical data storage entity, such as a file, that may be used by the application layer 123.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the drivers 106 after passing through any intervening layers such as layers 123 and 125a.

In connection with an embodiment in accordance with techniques herein, communications between an initiator port of the host and a target port of a data storage system (e.g., target port of an HA) may include those related to I/O operations and other non-I/O commands such as related to host control operations. I/O operations may include, for example, read and write operations.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In connection with a data storage system such as described herein, there may be many applications having their data stored on LUNs of the data storage system. On the data storage system, one or more logical entities referred to as storage groups (SGs) may be defined. Each storage group may be logical grouping of one or more LUNs. In usage, a storage group (SG) may be defined to include a set of one or more LUNs used by one or more particular applications. In this manner, I/Os directed to particular LUNs may be determined by the data storage system as I/O workload sent from one or more particular applications. For example, a first SG may include LUNs 1-3 and may be used to store data for application 1. A second SG may include LUNs 4-8 and may be used to store data for application 2. I/Os received at the data storage system directed to any of LUNs 1-3 may be determined as sent from application 1 and I/Os received at the data storage system directed to any of LUNs 4-8 may be determined as sent from application 2.

Described in following paragraphs are techniques may be used to partition resources of the data storage system for use by the multiple applications having their data stored on devices of the data storage system whereby such multiple applications send I/O operations and other requests to the data storage system. In accordance with such techniques, a current limit may be determined regarding resource usage for each SG or application having its data stored on one or more LUNs of an SG. The limit may generally specify a limit in terms of one or more workload metrics. For example, in following paragraphs, resource limits may be specified in terms of a number of I/Os per unit of time or I/O rate such as I/Os per second (IOPS). The I/Os measured and expressed in terms of the limits may be characterized as data storage front-end workload measurements in terms of the number of I/Os and associated I/O rate at which I/Os are received by the one or more HAs (e.g. front end components) of the data storage system from the host. As will be described in following paragraphs, techniques herein may be used to guarantee a specified minimum level of resources, and thus, performance, for each application, and also provide for optimal use of resources of the data storage system. It should be noted that the particular metric or workload measurement of IOPS is an example of one metric that may be used in connection with techniques herein. Other embodiments may use a different metric providing a measurement of workload or resource usage, such as front end component resource usage, by a tenant.

For each SG, also referred to herein as an application or more generally, a tenant T or consumer of resources of the data storage system, values for G_IOPS and M_IOPS may be specified. With respect to a tenant T, G_IOPS(T) may specify a minimum or guaranteed number of IOPS for tenant T and M_IOPS may specify a maximum or upper bound regarding a number of IOPS for tenant T. In this manner, an embodiment may specify values for the foregoing two parameters, G_IOPS(T) and M_IOPS(T) for each tenant T. Techniques herein may be used to determine a current limit for tenant T, CL_IOPS(T), specifying a limit of how many IOPS the tenant T is allowed to perform at the current time. At any time, for a tenant T, having a guaranteed number of IOPS, G_IOPS(T), and a maximum number of IOPS M_IOPS(T), the following holds true:

$$G\_IOPS(T) \leq CL\_IOPS(T) \leq M\_IOPS(T) \qquad \text{EQUATION 1}$$

For each tenant T, values for G_IOPS(T) and M_IOPS(T) may be specified and at any point in time, techniques herein may be used to determine a value for CL_IOPS(T) which may vary in accordance with one or more criteria as described herein such as in accordance with the state and usage of resources of the data storage system. In this manner, techniques herein may provide for dynamically determining and varying a current limit CL_IOPS(T) for each tenant over time. In one embodiment as will be described in more detail below, the current limits CL_IOPS(T) for each tenant T may vary with whether or not the data storage system is in a state of resource contention whereby if the data storage system is not in the state of resource contention, then CL_IOPS(T) for each tenant may be allowed to increase up to the particular upper bound M_IOPS(T) specified for each such tenant. In contrast, when the data storage system is in the state of resource contention, then CL_IOPS(T) for each tenant may be reduced subject to the particular lower bound G_IOPS(T) specified for each such tenant.

In this manner for a tenant T, G_IOPS(T) may be a guaranteed level of resource usage that is a lower bound of the resource limit range for the tenant. When application executes the application as the tenant T will be guaranteed at least this minimum level G_IOPS(T) level of resources. Additionally, if available, an amount of resources up to an upper bound M_IOPS(T) may be specified as the current limit. In this manner, a current limit (CL_IOPS(T)) may be defined which is a value in the inclusive range having a lower bound of G_IOPS(T) and an upper bound of M_IOPS(T). Thus, the application may be guaranteed at least the minimum amount of resources G_IOPS(T) and may be allowed, when possible to utilize up to an amount of resources specified by M_IOPS(T). With multiple applications or tenants, an embodiment may guarantee that all tenants may be able to utilize at least their respective G_IOPS(T) level of resources at any time. In such an embodiment, the various G_IOPS(T) collectively associated with the different tenants may be in accordance with the following:

$$\sum_{i=1}^{N} \text{G\_IOPS}(i) \le \text{MAX\_IOPS\_DS} \quad \text{EQUATION 1A}$$

Where N may be the number of applications, SGs or tenants in the system using techniques herein having a G_IOPS specified; and MAX_IOPS_DS represents the approximate overall maximum number of IOPS or I/O rate capability of the data storage system.

Based on EQUATION 1A, an embodiment may specify values for G_IOPS for all tenants so that the sum total of such G_IOPS values for all tenants does not exceed the maximum capability limits of the data storage system's I/O rate (MAX_IOPS_DS). In this manner, all applications may be able to utilize at least their respective G_IOPS level of resources.

As a variation, an embodiment may also choose to take a risk in connection with the total guaranteed workload or resource usage represented as the sum total of all G_IOPSs for all tenants. An embodiment may choose to bound the sum total, $\sum_{i=1}^{N}\text{G\_IOPS}(i)$, by a different collective upper bound other than MAX_IOPS_DS. For example, through historic or observed workloads, it may be determined probabilistically that it is unlikely for all tenants to actually utilize their specified G_IOPS level of resources at the same time. In this case, an embodiment may alternatively specify an upper bound for use with EQUATION 1A which is actually more than MAX_IOPS_DS. Such an embodiment may, for example, use an upper bound for the sum total, $\sum_{i=1}^{N}\text{G\_IOPS}(i)$, which is based on a multiplicative factor greater than 100% of MAX_IOPS_DS. For example, an embodiment may choose an upper bound of 110% or 1.1*MAX_IOP_DS.

As another example, an embodiment may observe through collected historic information that no more than a particular number of all applications or tenants are actively issuing I/Os at any point in time. For example, if there are 10 SGs for 10 applications, it may be that at most 8 applications and associated 8 SGs have ever been observed to execute and issue I/Os to the data storage system simultaneously. In this case, an embodiment may select an upper bound for the sum total, $\sum_{i=1}^{N}\text{G\_IOPS}(i)$ in accordance with N=8 so as to guarantee that at least 8 applications are able to obtain their associated G_IOPS level. The particular 8 applications whose G_IOPS values are used may be the largest 8 such G_IOPS values of the possible 10 G_IOPS values for the 10 SGs in the system.

More generally, any suitable technique may be used in selecting MAX_IOPS_DS or some other value as the collective upper bound for the sum total, G_IOPS (i), in connection with EQUATION 1A. It should be noted that each M_IOPS (T) may have a value selected so that M_IOPS(T)≥G_IOPS (T), and M_IOPS(T)≤MAX_IOPS_DS.

An embodiment may use one or more contention indicator criteria in connection with determining whether or not the data storage system has resource contention or more generally, whether it may be determined that resource contention is likely. Following are some exemplary criteria. An embodiment may use any one or more of the following contention indicator criteria, alone, or in combination with other suitable criteria, in connection with determining whether or not the data storage system has resource contention.

An embodiment may use contention indication criteria including HA (or more generally front-end data storage system component level) utilization. When HA utilization is less than a threshold amount of utilization, such as less than 60% utilization, it may be determined that there is no resource contention in the data storage system. In one embodiment, the foregoing HA utilization may be determined with respect to all HAs (e.g., all data storage system front end directors or components) having ports through which LUNs are exposed and wherein such LUNs are included in SGs subject to techniques herein. Utilization may be calculated using any suitable technique. For example, utilization may be calculated using a software tool or may be based on observed I/Os received. The utilization metric may be determined as an aggregate with respect to all HAs and associated target ports in the data storage system used in connection with techniques herein.

Utilization is a metric that may be used in an embodiment in connection with techniques herein as mentioned above for measuring or quantifying how busy a component in the data storage system is. Utilization may be expressed as a percentage and may refer to the amount of time a component is working versus its respective idle time. Utilization may be calculated and is workload dependent. Utilization may be expressed as a function of one or more factors, parameters or variables including any workload performance characteristic or metric and may vary for the particular component. Generally, expected utilization levels for a component given certain conditions may be known such as through prior experimentation and/or vendor supplied information. For example, a component's utilization may be expressed as a function of one or more parameters and the achieved utilization results from values supplied for the one or more parameters. Therefore, utilization may be calculated based on a set of parameters values, such as those which may be based on actual workload data used in measuring the utilization of a component. The factors used in determining utilization may vary with component and its function within a system. Workloads and utilizations do not necessarily behave empirically in a linear manner. For example, if one measures a 60% utilization for a particular workload, adding 10% to this workload may result in a 90% utilization, not 70%, as one might expect.

An embodiment may use contention indication criteria including criteria based on length(s) of one or more queues. One or more queues may be maintained for I/Os which are outstanding or which have been received at the data storage system and waiting to have service completed. In one embodiment, a single queue may be associated with each HA and may include outstanding I/O requests received at that HA. The length of the queue associated with the HA at a point in time may represent the number of outstanding I/O requests received at the HA and waiting for service to complete or otherwise commence. At periodic time intervals, such as every second, the current length of each HA queue may be determined. If the observed HA queue length exceeds a threshold length more than a threshold percentage of the time (e.g., more than a threshold number of times within a time period), then contention may be determined. To further illustrate, there may be N HAs and thus N queues. At each second, the current length of each of the N HA queues may be observed. Over the course of a time period, such as a minute, a count may be determined representing the number of times any observed queue length during that time period exceeded a threshold queue length. If the count exceeds a threshold count, then contention may be determined. Rather than use a count and threshold count, an embodiment may use other equivalent values such as a percentage and a threshold percentage (e.g., the percentage may be determined as a ratio of the count or number of times the observed queue length exceeded the threshold queue length with respect to the total number of observed queue lengths during the minute. The percentage may be compared to a threshold percentage and if the percentage exceeds the threshold percentage, then contention may be determined. For example, if more than 10% of the time the observed queue length exceeds 10, contention may be determined). It should be noted that values, such as a queue length=10, percentage threshold of 10%, sampling every second for a time period of 60 seconds, noted above are merely exemplary and an embodiment may use any suitable values.

As a variation to the foregoing, queues may be maintained and associated with other entities within the data storage system. For example, a separate queue may be maintained with respect to I/Os directed to each LUN and/or each SG and the above-mentioned processing similarly applied for use with such queues.

An embodiment may use contention indication criteria including RT (response time). Response time represents the amount of time it takes to complete an I/O operation or request. Response time may be characterized as including two components: service time and wait time. Service time is the actual amount of time spent servicing the request. The wait time is the amount of time the I/O request spends waiting in line or queue waiting for service (e.g., prior to servicing the I/O operation). A threshold RT may be specified. An average RT of the data storage system may be determined based on observed RTs for I/Os during a time period. If the average observed RT exceeds the threshold RT (e.g., such as 7 milliseconds), then contention may be determined. It should be noted that an embodiment may determine the average observed RT with respect to different types of I/Os received at the data storage system. As a first option, an embodiment may determine the average observed RT with respect to all I/O operations (e.g., all reads and all writes). As a second option, an embodiment may determine the average observed RT with respect to only read operations. As a third option, an embodiment may determine the average observed RT with respect to only particular types of read operations (e.g., only read hits whereby a read hit is a read operation that is serviced using data stored in cache and does not require retrieval of the data from the physical storage device, or only read misses whereby a read miss is a read operation that is not a read hit and is a read request for data that is not in cache and is therefore retrieved from the physical storage device to service the read operation).

An embodiment in accordance with techniques herein may determine a boolean indicator which is set to true if it is determined, in accordance with one or more contention indication criteria, that there is resource contention in the data storage system. Otherwise, the indicator may be set to false thereby denoting no resource contention as determined in accordance with the one or more criteria. In following paragraphs, the Boolean indicator denoting whether the data storage system is in contention or not may be referred to as SYS_OK (e.g. SYS_OK=true denotes that the data storage system has no resource contention as determined based on the one or more criteria; SYS_OK=false denotes otherwise (e.g., that the data storage system has resource contention as determined based on the one or more contention indication criteria). An embodiment may use one or more of the foregoing contention indication criteria (alone or in combination with other suitable criteria) in determining a value for SYS_OK at a point in time for use with techniques herein.

In one embodiment, the data storage system may be in one of two states: either a first state of compliance indicating that no resource contention exists or no resource contention is likely, or a second state of non-compliance indicating that that resource contention exists or is likely (e.g., potential for resource contention)). It should be noted that the SYS_OK indicator may provide a current assessment for a single point in time as to whether it is determined in accordance with the criteria that there is resource contention in the data storage system. As a furtherance, an embodiment may define the states of compliance and non-compliance to denote, respectively, a state of no resource contention and a state of resource contention. It should be noted that the data storage system may transition between the foregoing states of compliance and non-compliance. Transitioning between the states may be determined in accordance with the SYS_OK indicator at one or more points in time (multiple instances) and also additional information. Thus, the SYS_OK indicator may represent a determination of contention or no contention as determined for a single instance in accordance with the criteria, and the above-mentioned states of compliance and non-compliance may represent a state of resource contention or no resource contention which may span for a duration of more than the single instance and whereby the state may be determined using the SYS_OK indicator and possibly other information, as will be described in more detail below.

In one embodiment as described in following paragraphs, the states of compliant and non-compliant may include associated processing whereby the data storage system may not simply thrash or transition between the states of non-compliant and compliant each time the SYS_OK indicator changes. Processing and the amount of time in which the data storage system remains in a state, such as the non-compliance state, may facilitate stabilization of the data storage system and avoid unnecessary thrashing between the compliance and non-compliance states.

Figure 5:
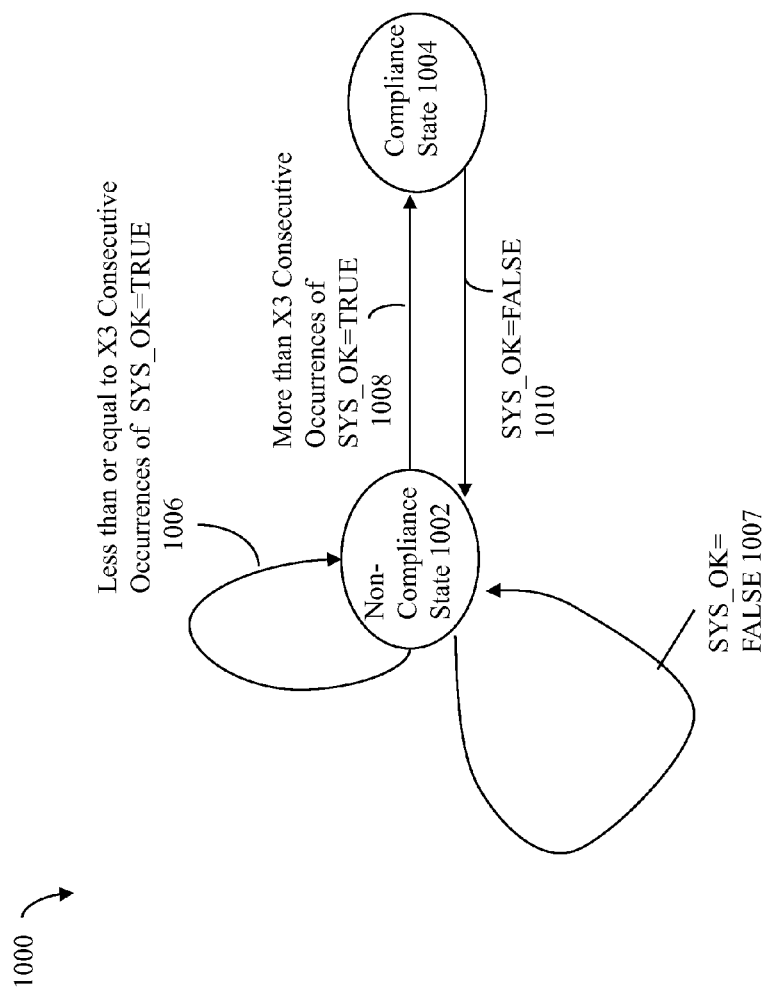
FIG. 5 is a state transition diagram illustrating the states and transitions between the states in connection with a data storage system in an embodiment in accordance with techniques herein.

Referring to FIG. 5, shown is an example illustrating a state transition diagram of the data storage system states of compliance and non-compliance used in an embodiment in accordance with techniques herein. The example 1000 includes non-compliance state 1002 and compliance state 1004. The compliance state 1004 may be the start or initial state of the data storage system. State transition criteria used in determining whether to transition between the states 1002 and 1004 may include the SYS_OK indicator and other information. An embodiment may obtain a revised current value for SYS_OK at consecutive period time intervals as will be described in more detail in following paragraphs.

If the SYS_OK indicator is FALSE and the data storage system is in the compliance state 1004, the data storage system may transition from the compliance state 1004 to the non-compliance state 1002 as illustrated by 1010. Once in the non-compliance state 1002, the embodiment described herein may require additional state transition criteria to be met besides a single instance of SYS_OK=TRUE before transitioning from state 1002 to state 1004. If the data storage system is in the non-compliance state 1002 and SYS_OK=FALSE, the data storage system remains in the non-compliance state 1002 (as illustrated by 1007). If the data storage system is in the non-compliance state 1002, an embodiment may require obtaining a threshold number of consecutive occurrences (X3) for which SYS_OK=TRUE in order to transition from the non-compliance state 1002 to the compliance state 1004. X3 may be a configurable parameter and may be an integer value, such as 5. As described below, selection of a value for X3 may be made in accordance with selection of other suitable values for configurable parameters.

As illustrated by 1006, if the data storage system is in the non-compliance state 1002 and receives less than or equal to X3 consecutive occurrences of SYS_OK=TRUE, the system remains in state 1002. As illustrated by transition 1008, the data storage system transitions from the non-compliance state 1002 to the compliance state 1004 when the SYS_OK indicator is TRUE for more than X3 consecutive occurrences.

Thus, in connection with one embodiment in accordance with techniques as illustrated in FIG. 5, state transition criteria to transition from the compliance state 1004 to the non-compliance state 1002 may include the SYS_OK indicator having a value of FALSE for a single time. State transition criteria to transition from the non-compliance state 1002 to the compliance state 1004 may include the SYS_OK indicator having a value of FALSE for more than a specified threshold number of consecutive times as denoted by X3. Additionally, as described elsewhere herein, the SYS_OK indicator may be characterized as an indicator of whether or not there is resource contention in the data storage system. The one or more criteria described elsewhere herein that may be used in connection with determining whether the SYS_OK indicator is TRUE (e.g., no contention) or FALSE (e.g., there is resource contention) may be generally characterized as resource contention indicator criteria or contention indicator criteria.

Figure 6:
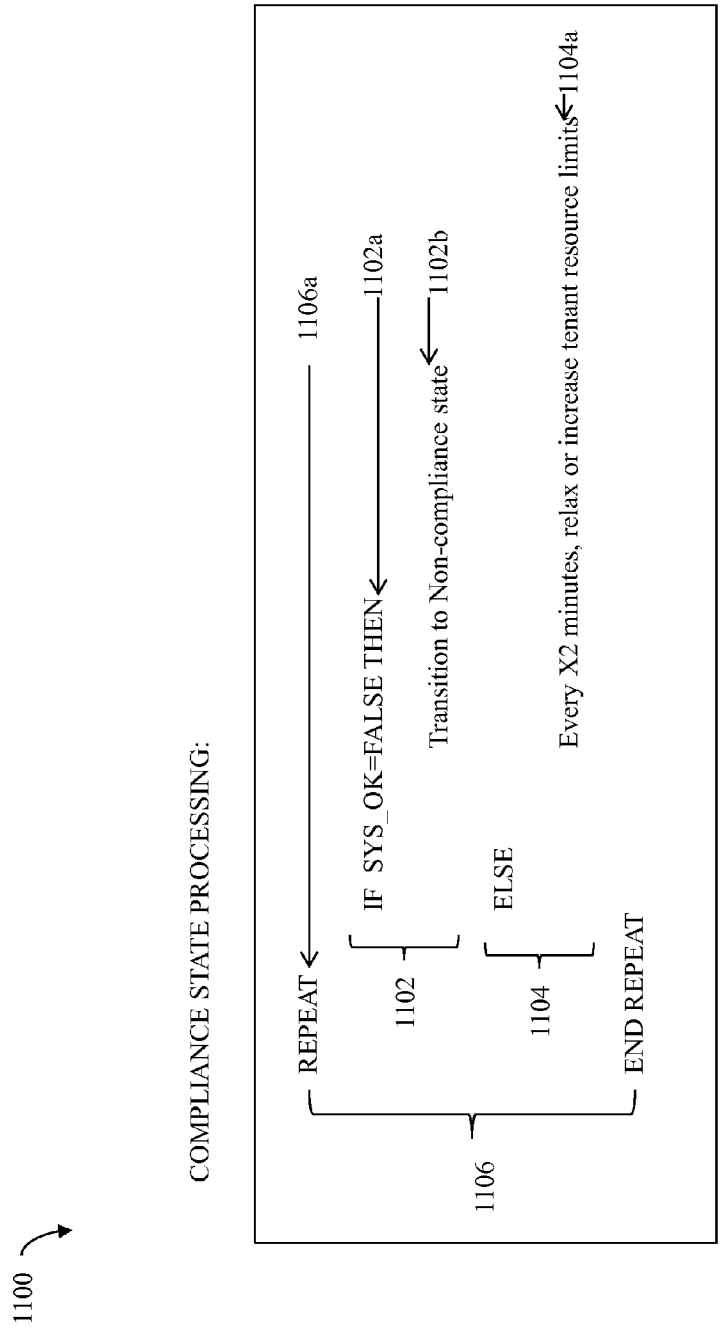
FIGS. 6-9 are examples of logical processing steps that may be performed in an embodiment in accordance with techniques herein.

Referring to FIG. 6, shown is an example 1100 of processing that may be performed for the compliance state in an embodiment in accordance with techniques herein. In connection with the example 1100 and other figures, processing steps may be described using a pseudo-code like description. The compliance processing of 1100 may be continually performed while in the compliance state as indicated by the REPEAT loop 1106 (e.g., the processing steps included in the repeat loop block 1106 are continually reiterated until processing is performed to transition to the non-compliance state as in step 1102*b* noted below).

Elements 1102 and 1104 illustrate processing comprising an IF-THEN-ELSE statement. At 1102*a*, a determination is made as to whether SYS_OK=FALSE. If SYS_OK is FALSE (thereby causing step 1102*a* to evaluate to true) the THEN portion of 1102 is performed whereby step 1102*b* is performed to transition to the non-compliance state. When the system transitions to the non-compliance state in step 1102*b*, non-compliance state processing as will be described in connection with FIG. 7 may be performed. Thus, execution of step 1102*b* results in a transfer of control out of compliance processing 1100 to begin non-compliance state processing of FIG. 7.

If SYS_OK=TRUE (thereby causing step 1102*a* to evaluate to false), the ELSE processing of 1104 is performed, whereby 1104*a* is performed. In step 1104*a*, tenant resource limits may be relaxed or increased every X2 minutes (with respect to the previous time that tenant resource limits were increased). Thus, tenant resource limits are further increased if SYS_OK=TRUE and also if at least X2 minutes has elapsed since the previous time tenant resource limits were increased. Additionally, tenant resource limits are increased if SYS_OK=TRUE and also there has been no previous increase in tenant resource limits. X2 may represent a configurable parameter and may be a value, such as 2 or 4. Additional detail of processing of step 1104*a* is described in more detail below in connection with FIG. 9. After step 1104*a*, control returns to step 1106*a* to perform a next iteration of the REPEAT LOOP 1106.

Figure 7:
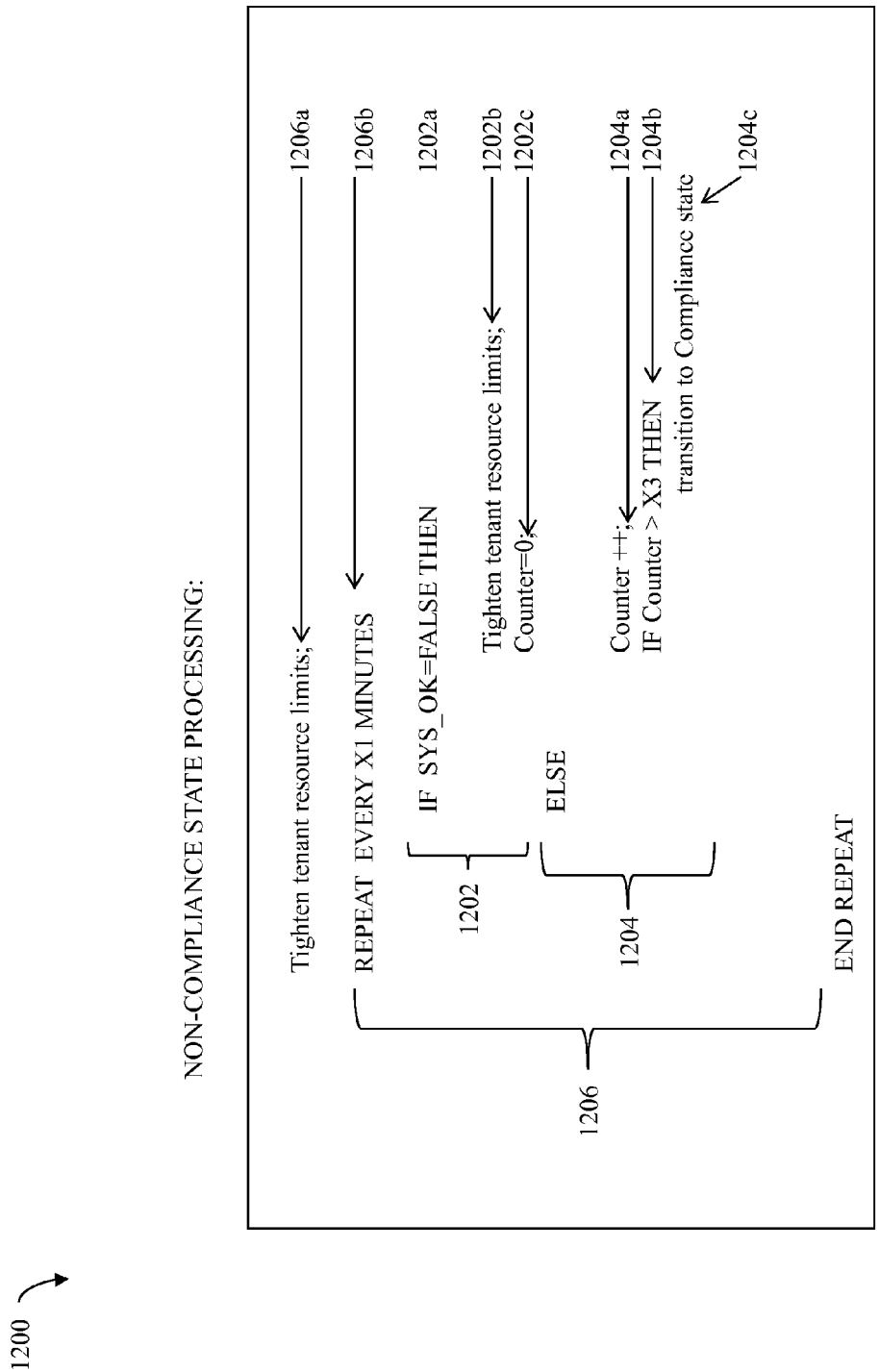

Referring to FIG. 7, shown is an example 1200 of processing that may be performed for the non-compliance state in an embodiment in accordance with techniques herein. As a first step 1206*a*, processing may be performed to tighten or further reduce tenant resource limits. Additional detail of step 1206*a* for tightening or reducing tenant resource limits is described below in connection with FIG. 8. As indicated by 1206*b*, processing of the REPEAT LOOP 1206 may be continually performed every X1 minutes while in the non-compliance state. X1 may represent a configurable parameter and may be a value, such as 1 or 2 minutes.

Elements 1202 and 1204 illustrate processing comprising an IF-THEN-ELSE statement. At 1102*a*, a determination is made as to whether SYS_OK=FALSE. If SYS_OK is FALSE (thereby causing step 1202*a* to evaluate to true) the THEN portion 1202 is performed whereby steps 1202*b* and 1202 *c* are performed. In step 1202*b*, processing may be performed to tighten or further reduce tenant resource limits. Step 1202*b* processing is similar to step 1206*a* processing whereby tightening or reducing tenant resource limits is described below in connection with FIG. 8. At step 1202*c*, a counter is assigned a value of 0. The counter in step 1202*c* is used to count a number of consecutive occurrences for which a value of SYS_OK=TRUE is obtained. Each time a value of SYS_OK=FALSE is obtained when in the non-compliance state, step 1202*c* reinitialized the counter back to 0. From step 1202*c*, control returns to step 1206*b* to perform a next iteration of the REPEAT LOOP 1206 upon the occurrence of the next X1 minutes elapsing.

If SYS_OK=TRUE (thereby causing step 1202*a* to evaluate to false), the ELSE portion 1204 is performed whereby steps 1204*a-b* are performed. In step 1204*a*, the counter is increased by 1. In step 1204*b*, a determination is made as to whether the counter has a current value of more than X3. If the counter is more than X3, step 1204*c* is performed whereby the data storage system transitions to the compliance state. When the system transitions from the non-compliance to the compliance state in step 1204*c*, compliance state processing is performed as described in connection with FIG. 6. Thus, execution of step 1204*c* results in a transfer of control out of non-compliance processing 1200 to begin compliance state processing of FIG. 6.

If in step 1204*b* it is determined that the counter is not greater than X3, control returns to step 1206*b* to perform a next iteration of the REPEAT LOOP upon the occurrence of the next X1 minutes elapsing.

It should be noted that an embodiment may select any suitable values for X1, X2 and X3. Some exemplary values are provided herein. As an additional general guideline, X1 may be less than X2 since tightening or reducing tenant limits may be characterized as more urgent than relaxing or increasing tenant limits. A value may be selected for X3 in accordance with the particular value selected for X1. For example, X1 (representing the amount of time for repeating processing of 1206) may be 2 minutes and X3 (as used in 1204b for determining when to transition from non-compliance to compliance) may be 5 whereby processing steps of 1206 may be repeated to allow the system 10 minutes to stabilize and adjust to the tightened or reduced limits introduced by step 1202b.

Figure 8:
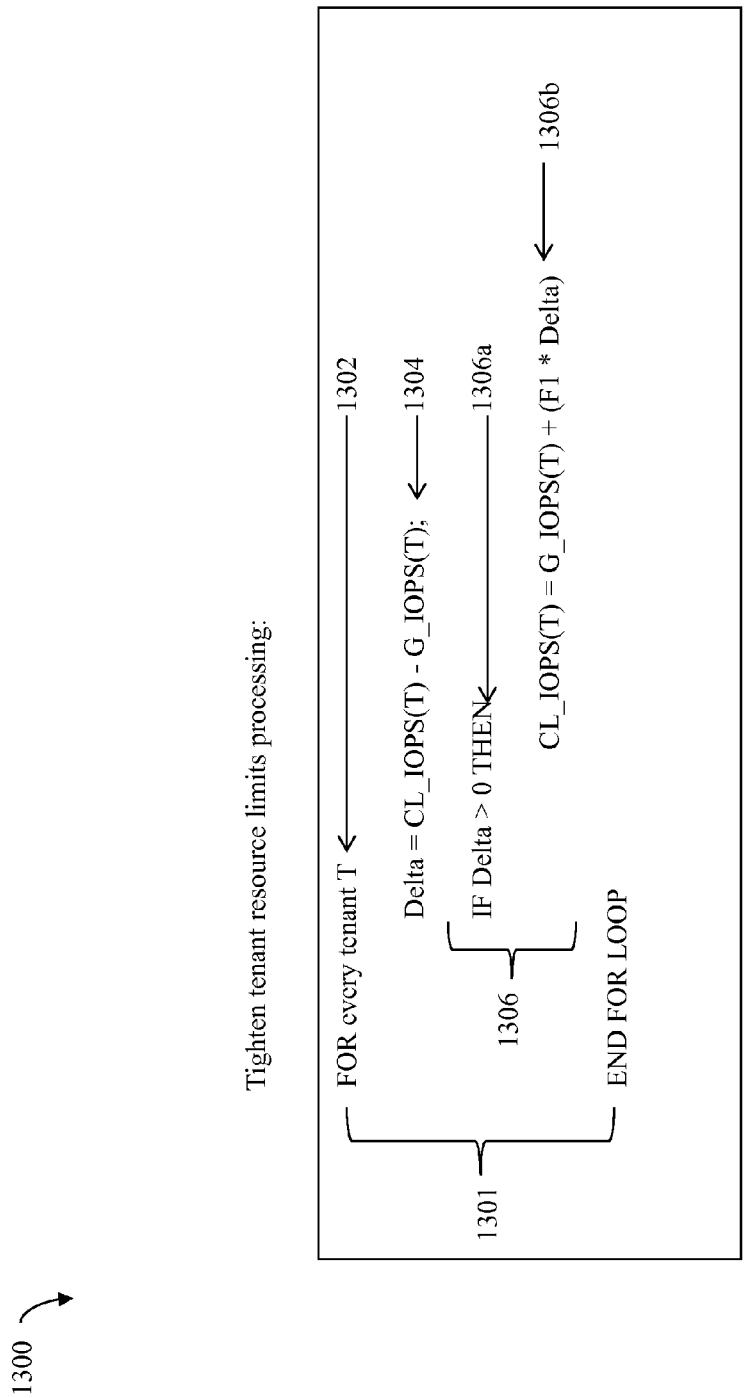

Referring to FIG. 8, shown is processing that may be performed in an embodiment in connection with tightening or reducing tenant resource limits. The example 1300 provides further details regarding processing that may be performed, for example, in connection with steps 1206a and 1202b of FIG. 7. As indicated by 1302, the steps of 1304 and 1306 comprising the FOR loop 1301 may be repeated with respect to each/every tenant T. At step 1304, Delta is assigned the difference between the current limit for tenant T, CL_IOPS(T) and the guaranteed lower bound of the limit range for tenant T, G_IOPS(T). At 1306a, a determination is made as to whether Delta is greater than zero. If Delta is greater than zero thereby causing step 1306a to evaluate to true, 1306b is performed where the current limit for tenant T, CL_IOPS(T), is updated as follows:

$$CL\_IOPS(T)=G\_IOPS(T)+(F1*\text{Delta}) \quad \text{EQUATION 2}$$

where
CL_IOPS(T) and G_IOPS(T) for the current tenant T are as described elsewhere herein;
Delta is as determined in step 1304; and
F1 may be a reduction factor affecting the reduction of the resource limit.

Generally, F1 may be a numeric value that is a positive value that is less than 1. For example, F1 may be 0.6 or 60% thereby reducing the value of Delta by 40% each time the processing of 1300 is performed. In one embodiment, F1 may be a configurable value whereby the same F1 may be used for each tenant. Alternatively, an embodiment may specify more than one value for F1 and may use different F1 values for different tenants in accordance with a desired rate of reduction for particular tenants.

After execution of 1306b, 1301 processing is repeated for each remaining tenant. Similarly, if Delta is not greater than zero thereby causing step 1306a to evaluate to false, 1301 processing may then be repeated once for each remaining tenant.

In connection with tightening or reducing tenant resource limits, one or more limit reduction criteria may be used. Examples of limit reduction criteria that may be used in an embodiment are described in connection with FIG. 8. For example, limit reduction criteria used in determining a reduced resource limit for a tenant may include any of the current limit for the tenant (e.g., CL_IOPS(T)), the guaranteed limit (e.g., G_IOPS(T) or lower bound of the limit range for the tenant, the difference (e.g., Delta) between the current limit and guaranteed or lower bound of the limit range for the tenant, requiring that the foregoing difference be greater than a specified value such as zero (e.g., see 1306a), a constant factor (e.g., F1) affecting the reduction of the resource limit, the product of the constant factor and the difference (e.g., F1*Delta in 1306b), and/or the sum of the foregoing product and the guaranteed limit or lower bound (e.g., G_IOPS(T)+ (F1*Delta) in 1306b). More generally, an embodiment may use any one or more of the foregoing alone, or in combination with other suitable criteria.

Figure 9:
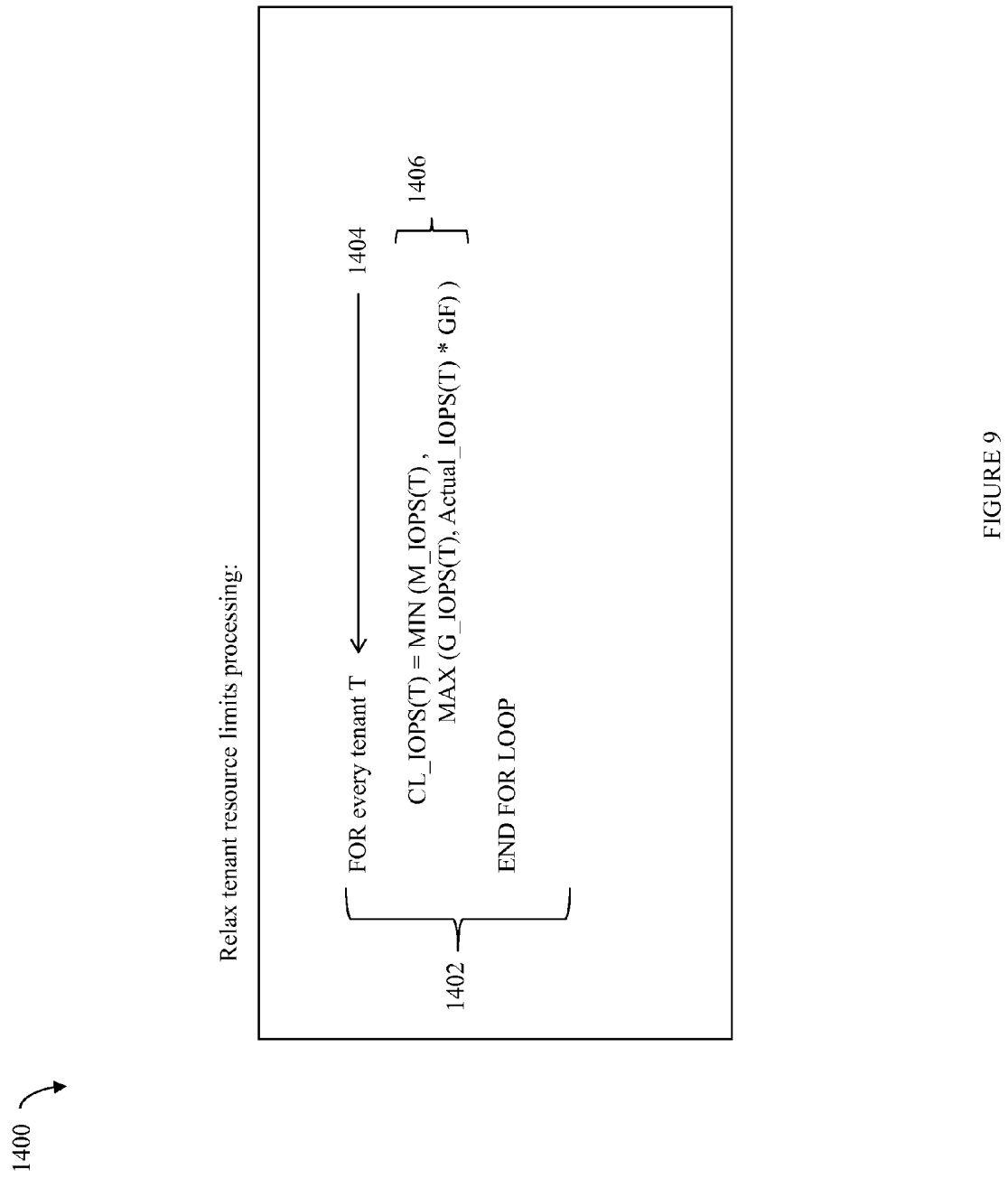

Referring to FIG. 9, shown is processing that may be performed in an embodiment in connection with relaxing or increasing tenant resource limits. The example 1400 provides further details regarding processing that may be performed, for example, in connection with step 1104a of FIG. 6.

As indicated by 1404, the step 1406 comprising the FOR loop 1402 may be repeated with respect to each/every tenant T. At step 1406, processing is performed where the current limit for tenant T, CL_IOPS(T), may be updated as follows:

$$CL\_IOPS(T)=\text{MIN}(M\_IOPS(T),\text{MAX}(G\_IOPS(T),\text{Actual\_IOPS}(T)*GF)) \quad \text{EQUATION 3}$$

where
CL_IOPS(T), G_IOPS(T), and M_IOPS(T) for the current tenant T are as described elsewhere herein;
MIN represents a MINIMUM function where the result is the smallest value of all arguments (e.g., the arguments are specified as a list of arguments whereby any two arguments are separated by a comma);
MAX represents a MAXIMUM function where the result is the largest value of all arguments (e.g., the arguments are specified as a list of arguments whereby any two arguments are separated by a comma);
Actual_IOPS(T) represents the current rate of I/Os (e.g. I/Os per second) observed for the tenant T; and
GF may be a growth factor affecting the rate at which the resource limit in terms of IOPS is increased for the tenant.

Generally, GF may have a positive real value that is more than 1.0. For example, GF may be 1.1 or 110% thereby increasing the resource limit usage by up to 10% (e.g., with respect to observed or actually used resources by tenant T, Actual_IOPS(T)) each time step 1406 is performed. In one embodiment, GF may be a configurable value whereby the same GF may be used for each tenant. Alternatively, an embodiment may specify more than one value for GF and may use different GF values for different tenants in accordance with a desired rate of growth or increase in resource limits for particular tenants.

After execution of step 1406 for the current tenant, FOR LOOP processing 1402 may then repeated once for each remaining tenant.

In connection with relaxing or increasing tenant resource limits, one or more limit growth or relaxation criteria may be used. Examples of limit growth or relaxation criteria that may be used in an embodiment are described in connection with FIG. 8. For example, limit growth or relaxation criteria used in determining a resource limit for a tenant may include the maximum (e.g., M_IOPS(T)) or upper bound of the limit range for the tenant, the guaranteed (e.g., G_IOPS(T)) or lower bound of the limit range for the tenant, the actual resource usage or resource usage rate (e.g., Actual_IOPS(T)) for the tenant, a growth factor (e.g., GF), a mathematical product of the growth factor and the actual resource usage or usage rate for the tenant (e.g., Actual_IOPS(T)*GF in 1406), the maximum of the lower bound of the tenant's resource limit range and the foregoing product (e.g., MAX (G_IOPS (T), (Actual_IOPS(T)*GF) in 1406), and/or the minimum or lesser of the foregoing maximum and the lower bound of the limit range for the tenant (e.g., MIN (M_IOPS(T), MAX (G_IOPS(T), Actual_IOPS(T)*GF) in 1406). More generally, an embodiment may use any one or more of the foregoing alone, or in combination with other suitable criteria.

It should be noted that embodiment may specify values for M_IOPS(T) for particular tenants, or change/vary factors such as GF based on a priority associated with the application or tenant. For example a first tenant may pay more money in accordance with a service agreement to have higher priority or quality of service (QOS) than a second tenant. The first tenant may have a larger M_IOPS than the second tenant due to the higher QOS or priority over the second tenant. Additionally, the GF used in determining the rate of growth for the first tenant may be larger than the value for GF used in determining the rate of growth for the second tenant due to the first tenant's higher QOS than the second tenant. The foregoing as well as other factors may affect the particular values selected for use with each tenant.

The foregoing describes techniques used to dynamically determine a current limit CL_IOPS(T) for each tenant based on a current state of compliance or non-compliance of the data storage system whereby compliance is associated with a state of no resource contention and non-compliance is associated with a state of resource contention or likely resource contention. An embodiment may also provide an option setting or switch whereby a user may configure the data storage system to determine current limits dynamically for each tenant as just described or use some other selected technique to determine the current limits for the tenants. For example, an embodiment in accordance with techniques herein may include support for a second alternative technique using a static or a fixed limit for each tenant as the tenant's current limit. Through specifying a first value for the option setting, the data storage system may be configured to dynamically determine tenant resource limits. Alternatively and in contrast to specifying the first value for the option setting, a second different value for the option setting may be specified. When the second value is specified as the option setting, the data storage system may be configured to use a single static or fixed limit for each tenant as the maximum amount of allowable resources that may be used by that particular tenant whereby such limit does not change over time and is not dynamically determined and varied in accordance with the state of the data storage system.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of partitioning resources comprising:
specifying a plurality of resource limit ranges for a plurality of tenants of a system, each of said plurality of resource limit ranges having a lower bound and an upper bound;
determining, using a processor, a plurality of current resource limits, each of said plurality of current resource limits indicating a current resource limit for one of said plurality of tenants, wherein said each current resource limit for said one tenant is a value included in one of the plurality of resource limit ranges specified for said one tenant, and wherein said plurality of current resource limits are dynamically determined in accordance with a current state of the system;
enforcing, using a processor, the plurality of current resource limits for the plurality of tenants thereby affecting resources of the system utilized by the plurality of tenants;
determining, using a processor, whether the current state of the system is a compliance state; and
responsive to determining the current state of the system is the compliance state, allowing the plurality of current resource limits each having an associated one of the plurality of resource limit ranges to increase up to the upper bound of the associated one of the plurality of resource limit ranges.

2. The method of claim 1, wherein said each current resource limit for said one tenant indicates a current maximum amount of resource consumption allowable for said one tenant in a data storage system.

3. The method of claim 2, wherein said one resource limit range for said one tenant has a lower bound identifying a minimum allowable value for said each current resource limit for said one tenant.

4. The method of claim 3, wherein said one resource limit range for said one tenant has an upper bound identifying a maximum allowable value for said each current resource limit for said one tenant.

5. The method of claim 1, wherein the system is a data storage system and wherein the current state of the data storage system is one of the compliance state and a non-compliance state.

6. The method of claim 5, wherein when the data storage system is in said compliance state, the data storage system is determined to have no resource contention or that no resource contention is likely, and wherein the data storage system is otherwise in said non-compliance state if not in said compliance state.

7. The method of claim 6, wherein the data storage system transitions between said compliance state and said non-compliance state in accordance with state transition criteria.

8. The method of claim 7, further comprising:
determining at a point in time whether the data storage system has resource contention or is likely to have resource contention, wherein said state transition criteria includes an indicator having a first setting at the point in time if it is determined at the point in time that the data storage system has no resource contention or that no resource contention is likely, and otherwise said indicator has a second setting.

9. The method of claim 8, wherein said state transition criteria includes said indicator and specifies that if the data storage system is in the compliance state at the point in time and the indicator has said second setting at the point in time, the data storage system transitions from the compliance state to the non-compliance state.

10. The method of claim 9, wherein said state transition criteria specifies that if the data storage system is in the non-compliance state at the point in time, the data storage system remains in the non-compliance state until the indicator has a value of said first setting for more than a threshold number of consecutive points in time, whereby the data storage system transitions from the non-compliance state to the compliance state after the indicator has a value of said first setting more than the threshold number of consecutive points in time.

11. The method of claim 8, wherein said plurality of tenants are applications executing on one or more hosts that issue data operations to the data storage system, and wherein said indicator has a value of said first setting or said second setting determined in accordance with one or more contention indicator criteria including any of a utilization threshold denoting a level of utilization of one or more front end components of the data storage system at which data operation requests are received from said applications, a threshold length of one or more queues of outstanding data operations received at the data storage system and a threshold amount of times that said threshold length is exceeded, and a threshold response time.

12. The method of claim 7, wherein when in said non-compliance state, first processing is performed, said first processing including processing to reduce one or more of said plurality of current resource limits in accordance with one or more limit reduction criteria.

13. The method of claim 12, wherein a first of the plurality of tenants has a first of the plurality of current resource limits that is a first value included in a first of the plurality of resource limit ranges associated with the first tenant, and said first processing performed with respect to said first tenant further comprises:
    determining whether the first current resource limit is greater than a first lower bound of the first resource limit range; and
    reducing the first current resource limit to a first reduced limit if the first current resource limit is greater than the first lower bound, wherein said first lower bound is included in the limit reduction criteria.

14. The method of claim 13, wherein said first reduced limit is determined in accordance with the limit reduction criteria including the first lower bound, a difference between the first lower bound and the first current resource limit, and a reduction factor.

15. The method of claim 7, wherein when in said compliance state, first processing is performed, said first processing including processing to increase one or more of said plurality of current resource limits in accordance with one or more limit growth criteria.

16. The method of claim 15, wherein a first of the plurality of tenants has a first of the plurality of current resource limits that is a first value included in a first of the plurality of resource limit ranges associated with the first tenant, and said first processing performed with respect to said first tenant increases the first current resource limit for the first tenant if the first current resource limit does not exceed a first upper bound of the first resource limit range, wherein said limit growth criteria includes said first upper bound.

17. The method of claim 16, wherein said first processing includes determining a revised first current resource limit for the first tenant in accordance with said limit growth criteria including the first upper bound, a first lower bound of the first resource limit range, an actual resource usage or actual resource usage rate denoting current resource usage by the first tenant, and a growth factor.

18. The method of claim 1, wherein the system is a data storage system and said plurality of tenants are applications executing on one or more hosts that issue data operations to the data storage system, and wherein each of said plurality of resource limit ranges specifies a lower bound that is a minimum I/O rate and an upper bound that is a maximum I/O rate, and wherein each of said plurality of current resource limits indicates a current resource limit for one of the plurality of resource limit ranges and specifies a current I/O rate limit for one of the applications associated with said each current resource limit and said one resource limit range.

19. The method of claim 1, wherein said plurality of current resource limits are determined in accordance with first processing when an option has a first value and wherein said plurality of current resource limits are determined in accordance with second processing when the option has a second value different from the first value, wherein said first processing dynamically determines said plurality of current resource limits in accordance with the current state of the data storage system and wherein said second processing determines each of said plurality of current resource limits as a single static value that does not vary dynamically in accordance with the current state of the data storage system.

20. A non-transitory computer readable medium comprising code stored thereon that, when executed, performs a method of partitioning resources comprising:
    specifying a plurality of resource limit ranges for a plurality of tenants of a system, each of said plurality of resource limit ranges having a lower bound and an upper bound;
    determining, using a processor, a plurality of current resource limits, each of said plurality of current resource limits indicating a current resource limit for one of said plurality of tenants, wherein said each current resource limit for said one tenant is a value included in one of the plurality of resource limit ranges specified for said one tenant, and wherein said plurality of current resource limits are dynamically determined in accordance with a current state of the system;
    enforcing, using a processor, the plurality of current resource limits for the plurality of tenants thereby affecting resources of the system utilized by the plurality of tenants;
    determining, using a processor, whether the current state of the system is a compliance state; and
    responsive to determining the current state of the system is the compliance state, allowing the plurality of current resource limits each having an associated one of the plurality of resource limit ranges to increase up to the upper bound of the associated one of the plurality of resource limit ranges.

* * * * *